(12) United States Patent
Seto

(10) Patent No.: US 10,458,309 B2
(45) Date of Patent: Oct. 29, 2019

(54) WORK VEHICLE

(71) Applicant: Komatsu Ltd., Tokyo (JP)

(72) Inventor: Yohei Seto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 215 days.

(21) Appl. No.: 15/533,163

(22) PCT Filed: Dec. 28, 2016

(86) PCT No.: PCT/JP2016/089105
§ 371 (c)(1),
(2) Date: Jun. 5, 2017

(87) PCT Pub. No.: WO2018/123021
PCT Pub. Date: Jul. 5, 2018

(65) Prior Publication Data
US 2018/0258831 A1 Sep. 13, 2018

(51) Int. Cl.
| | | |
|---|---|---|
| *F01P 5/02* | (2006.01) |
| *F01P 5/06* | (2006.01) |
| *B60K 11/04* | (2006.01) |
| *F04D 19/00* | (2006.01) |
| *F04D 25/04* | (2006.01) |
| *F04D 29/60* | (2006.01) |
| *F04D 29/70* | (2006.01) |

(Continued)

(52) U.S. Cl.
CPC ............... *F01P 5/06* (2013.01); *B60K 11/04* (2013.01); *E02F 9/0866* (2013.01); *F01P 5/02* (2013.01); *F01P 11/10* (2013.01); *F04D 19/002* (2013.01); *F04D 25/04* (2013.01); *F04D 29/601* (2013.01); *F04D 29/703* (2013.01); *B60Y 2200/41* (2013.01); *F01P 2070/50* (2013.01)

(58) Field of Classification Search
CPC ...... F01P 5/06; F01P 5/02; F01P 11/10; F01P 2070/50; F02F 9/0866; F04D 29/703; F04D 29/601; F04D 25/04; F04D 19/002; B60K 11/04; B60Y 2200/41
USPC .............................................. 123/41.7, 41.49
See application file for complete search history.

(56) References Cited

U.S. PATENT DOCUMENTS

| | | | |
|---|---|---|---|
| 5,410,992 A * | 5/1995 | Hunt | .............. F01P 5/06 123/41.49 |
| 5,623,893 A | 4/1997 | Bartz et al. | |

(Continued)

FOREIGN PATENT DOCUMENTS

| | | |
|---|---|---|
| EP | 2000645 A2 | 12/2008 |
| JP | 2000-345845 A | 12/2000 |

(Continued)

*Primary Examiner* — Hai H Huynh
(74) *Attorney, Agent, or Firm* — Locke Lord LLP

(57) ABSTRACT

A work vehicle includes a blower unit that includes a movable bracket rotatably supported to a vehicle body, a fan supported to the movable bracket and rotationally driven around an axis, and a movable shroud covering the fan from an outer peripheral side. The movable shroud includes a shroud body supported so as to face the movable bracket and surrounding the fan, a ring shroud formed in an annular shape and provided between the shroud body and an outer peripheral end of the fan, and a bolt fixing the ring shroud to the shroud body from a side opposite to a side on which is supported to the movable bracket when viewed from the shroud body.

20 Claims, 9 Drawing Sheets

(51) Int. Cl.
*F01P 11/10* (2006.01)
*E02F 9/08* (2006.01)

(56) References Cited

U.S. PATENT DOCUMENTS

| | | | | |
|---|---|---|---|---|
| 2005/0180848 | A1* | 8/2005 | Brown | F04D 29/545 |
| | | | | 415/220 |
| 2014/0147257 | A1 | 5/2014 | Sasinowski et al. | |
| 2018/0266075 | A1* | 9/2018 | Miyamoto | B60K 11/02 |
| 2018/0266076 | A1* | 9/2018 | Sakron | E02F 9/0866 |
| 2018/0266303 | A1* | 9/2018 | Miyamoto | B60K 11/02 |

FOREIGN PATENT DOCUMENTS

| | | |
|---|---|---|
| JP | 2004-142597 A | 5/2004 |
| JP | 2005-126902 A | 5/2005 |
| JP | 2010-248990 A | 11/2010 |
| JP | 2012-082580 A | 4/2012 |
| WO | 2004/099581 A1 | 11/2004 |

\* cited by examiner

WORK VEHICLE

TECHNICAL FIELD

The present invention relates to a work vehicle.

BACKGROUND ART

Patent Document 1 discloses a wheel loader, which includes a cooling unit which has a radiator or the like and a blower unit which has a fan and a shroud and blows air to the cooling unit, as an example of a work vehicle.

The shroud of the work vehicle is configured of a shroud body and a ring shroud which is detachably attached to an inner peripheral side of the shroud body. In the work vehicle disclosed in Patent Document 1, a clearance adjustment between the fan and the shroud is performed by replacing the ring shroud attached to the shroud body with another ring shroud having different dimensions.

CITATION LIST

Patent Literature

[Patent Document 1] Japanese Unexamined Patent Application, First Publication No. 2012-82580

SUMMARY OF INVENTION

Technical Problem

The shroud and the fan may be provided to be openable and closable with respect to the vehicle body. In this case, a structure member for rotatably supporting the shroud and the fan with respect to the vehicle body may interfere with a clearance adjustment work between the shroud and the fan.

The present invention is made in consideration of the above-described problem, and an object thereof is to provide a work vehicle in which a clearance adjustment between the shroud and the fan can be easily performed.

Solution to Problem

According to an aspect of the present invention, a work vehicle includes: a vehicle body that includes a heat exchange room in which an opening portion facing a rear side is formed; a cooling unit that is provided in the heat exchange room and includes a rear surface facing the rear side; and a blower unit that includes a structure member rotatably supported to the vehicle body, a fan supported to the structure member and rotationally driven around an axis, and a movable shroud covering the fan from an outer peripheral side, and the blower unit is rotatable between a closed position and an open position, the closed position being a position at which the blower unit faces the rear surface of the cooling unit and the axis is positioned in a forward-backward direction of the vehicle body, the open position being a position at which the blower unit exposes the rear surface of the cooling unit. The movable shroud includes a shroud body that is supported so as to face the structure member and surrounds the fan, a ring shroud that is formed in an annular shape and is provided between the shroud body and an outer peripheral end of the fan, and a fixing portion that fixes the ring shroud to the shroud body from a side opposite to a side on which the shroud body is supported to the structure member.

According to this configuration, since the structure member and the fixing portion are positioned on sides opposite to each other when viewed from the shroud body, when the ring shroud is fixed to the shroud body by the fixing portion, the structure member does not interfere with a work. Accordingly, it is possible easily perform a position adjustment work while fixing the ring shroud.

Advantageous Effects of Invention

According to the work vehicle of the present invention, it is possible to easily perform a clearance adjustment between the shroud and the fan.

DESCRIPTION OF EMBODIMENTS

<Embodiment>

Hereinafter, an embodiment of a wheel loader as an example of a work vehicle according to the present invention will be described in detail with reference to FIGS. 1 to 8.

<Work Vehicle>

Figure 1:
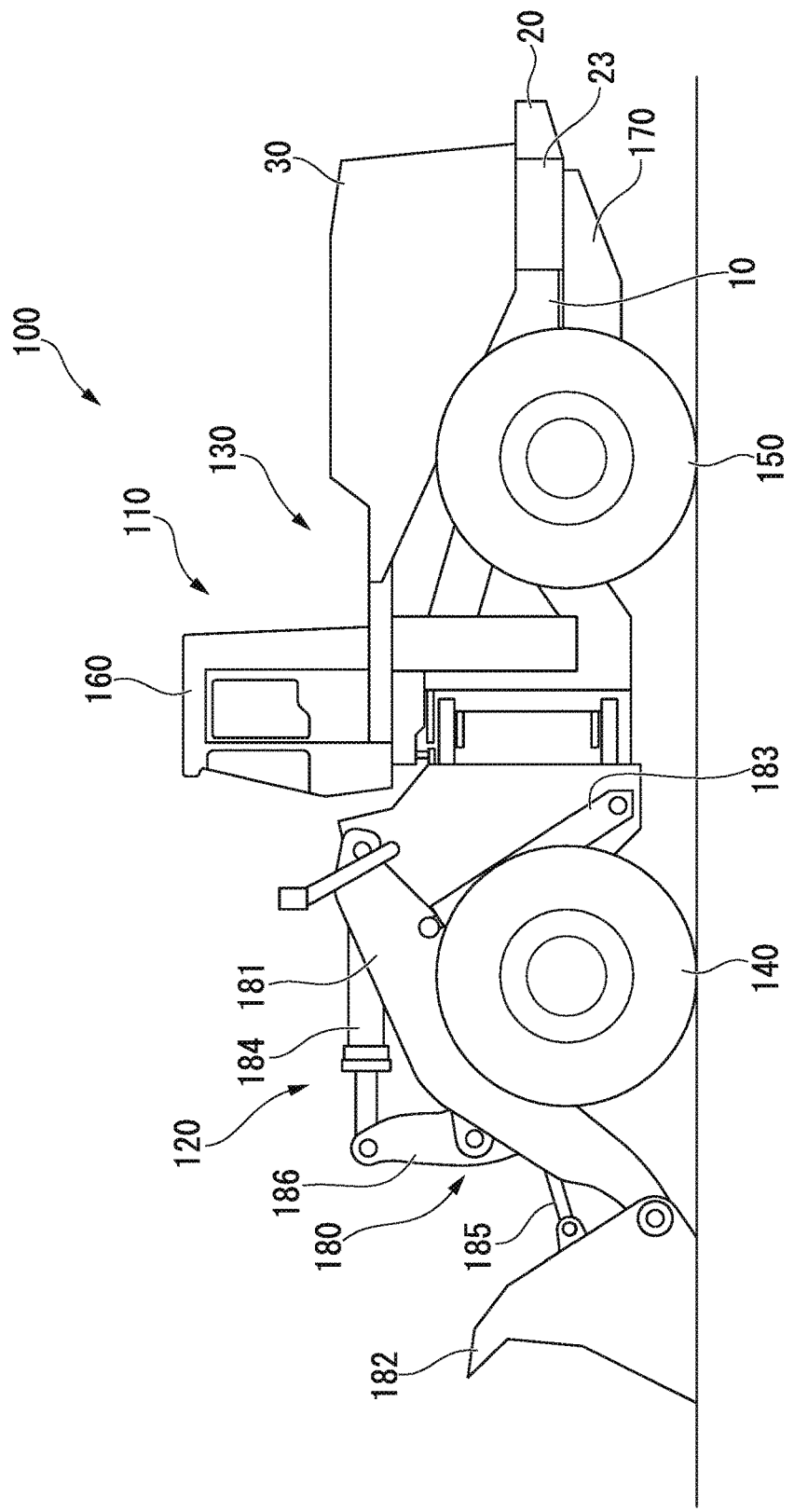
FIG. 1 is a side view of a wheel loader as a work vehicle according to an embodiment of the present invention.
Figure 2:
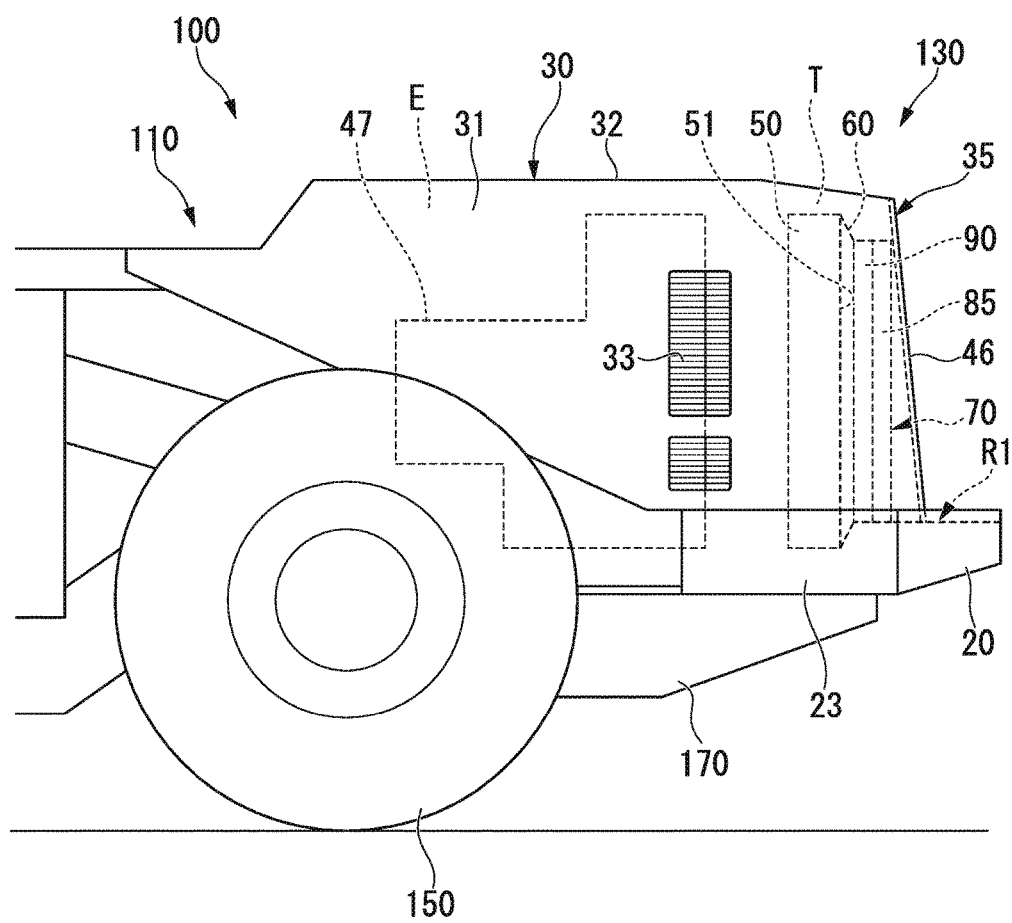
FIG. 2 is a side view of a vehicle rear portion of the wheel loader as the work vehicle according to the embodiment of the present invention.

As shown in FIGS. 1 and 2, a wheel loader 100 as a work vehicle includes a vehicle body 110, a work vehicle 180, an engine 47, a cooling unit 50, a fixation shroud 60, and a blower unit (movable portion) 70.

As shown in FIG. 1, the vehicle body 110 includes a vehicle front portion 120, a vehicle rear portion 130, front wheels 140, rear wheels 150, a cab 160, and a fuel tank 170. The vehicle front portion 120 configures a front portion of the vehicle body 110 and the vehicle rear portion 130 configures a rear portion of the vehicle body 110. The vehicle front portion 120 and the vehicle rear portion 130 are connected to be rotatable in a horizontal direction to each other.

The front wheels 140 are provided in the vehicle front portion 120 and the rear wheels 150 are provided in the vehicle rear portion 130. The vehicle body 110 moves forward and backward by driving the front wheels 140 and the rear wheels 150.

The cab 160 is provided to protrude upward on the portion on the front side of the vehicle rear portion 130. A driver seat is provided inside the cab 160.

The fuel tank 170 is provided below the vehicle rear portion 130, and a fuel is stored inside the fuel tank 170.

Hereinafter, a forward-backward direction, a front side, a rear side, and a width direction of the vehicle body 110 may be simply referred to as a "forward-backward direction", a "front side", a "rear side", and a "width direction", respectively. In addition, the width direction may be referred to as a "right side" or a "left side". In addition, a side toward the center in the width direction may be referred to as an "inside", and a side from the center in the width direction toward the right side or the left side may be referred to as an "outside".

The work vehicle 180 is provided on a front side portion of the vehicle front portion 120 of the vehicle body 110. The work vehicle 180 includes a boom 181 and a bucket 182. The boom 181 is connected to the vehicle body 110 to be rotatable. In addition, the bucket 182 is connected to one end of a bell crank 186 via a link 185. A bucket drive cylinder 184 is connected to the other end of the bell crank 186. The bucket 182 is connected to the tip of the boom 181 to be rotatable. The boom 181 is driven by a boom drive cylinder 183 and the bucket 182 is driven by the bucket drive cylinder 184. The boom drive cylinder 183 and the bucket drive cylinder 184 are driven by a hydraulic pressure supplied via a hydraulic circuit.

<Vehicle Rear Portion>

Hereinafter, a vehicle rear portion 130 will be described in more detail with reference to FIGS. 2 to 4.

The vehicle rear portion 130 includes a rear frame 10, a bumper 20, an exterior cover 30, a support frame 40, and a grille 46.

The rear frame 10 has a bar shape which extends in the forward-backward direction, and a pair of rear frames 10 is provided to be parallel to each other with an interval therebetween in the width direction.

<Bumper>

The bumper 20 is provided to extend in the width direction over the pair of rear frames 10 on the rear sides of the pair of rear frames 10. The bumper 20 may be directly fixed to the pair of rear frames 10, or may be fixed to the pair of rear frames 10 via another member such as an end plate provided over the pair of rear frames 10.

Figure 3:
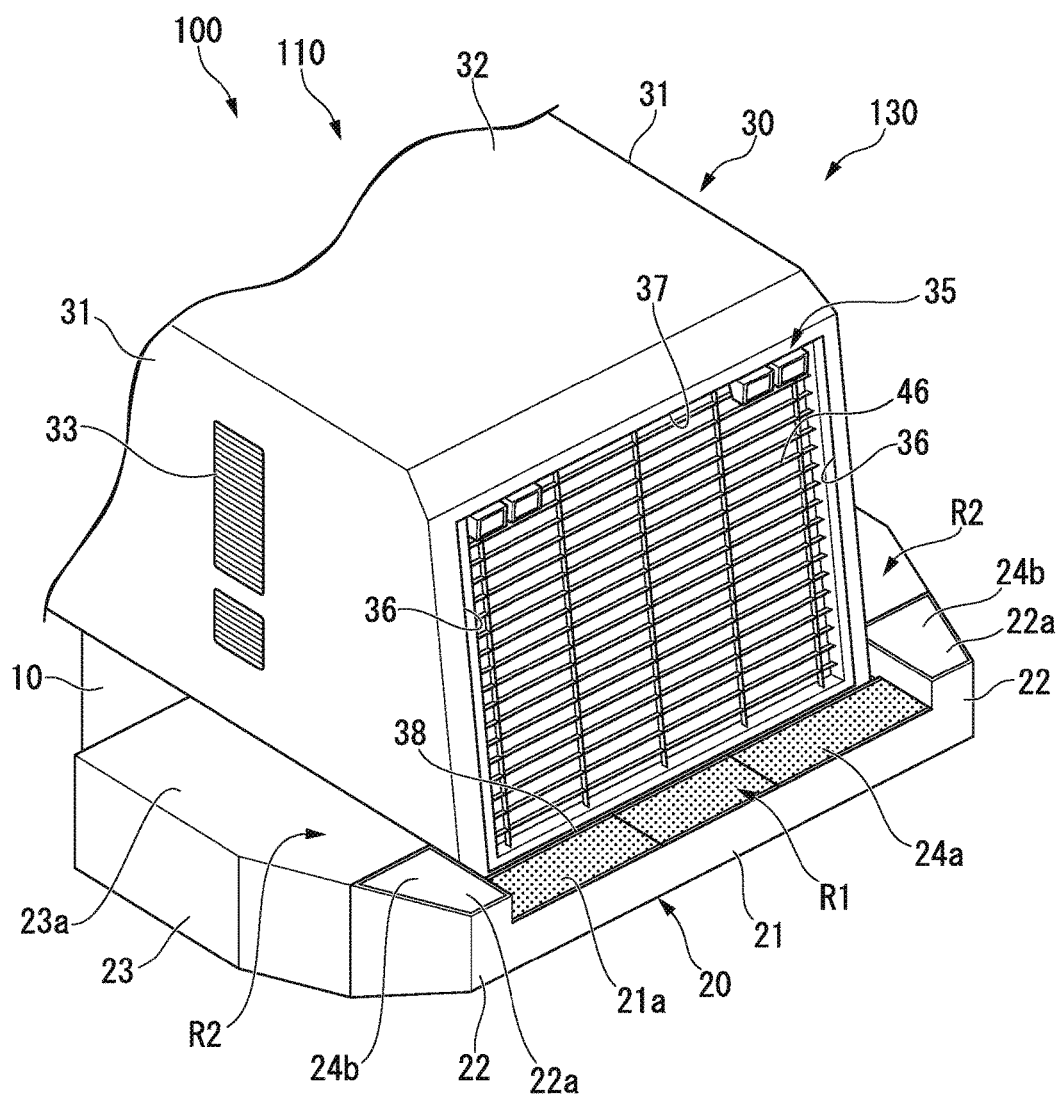
FIG. 3 is a perspective view of the vehicle rear portion of the wheel loader as the work vehicle according to the embodiment of the present invention.

As shown in FIG. 3, in the bumper 20, the center portion in the width direction becomes a bumper center portion 21, and both right and left portions of the bumper center portion 21 become bumper side portions 22.

The bumper center portion 21 extends over the gap between the pair of rear frames 10 in the width direction. More specifically, the bumper center portion 21 extends between an end portion on the outside in the width direction of one rear frame 10 and an end portion on the outside in the width direction of the other rear frame 10. An upper surface 21a of the bumper center portion 21 extends in the width direction so as to be parallel to a horizontal surface, and a portion on the upper surface 21a extends in the width direction and becomes a rear passage R1 through which a worker can pass. In the present embodiment, a nonslip mat 24a which is formed of a resin or the like is provided on the upper surface 21a of the bumper center portion 21, which becomes the rear passage R1, over the width direction of the vehicle body 110. The nonslip mat 24a may be a steel plate having an uneven surface.

The bumper side portions 22 are positioned further outside in the width direction than the outside of the rear frame 10 in the width direction and are provided on both end sides of the bumper center portion 21. An upper surface 22a of each of the bumper side portions 22 is parallel to the horizontal surface, and is disposed so as to be higher by one step than the bumper center portion 21. Accordingly, a step is formed between the upper surface 22a of the bumper side portion 22 and the upper surface 21a of the bumper center portion 21.

For example, an accommodation portion 23 in which a device such as a battery can be accommodated is provided on the front sides of the bumper side portions 22 and the outside of the rear frame 10 in the width direction. The rear side of the accommodation portion 23 is in contact with the bumper side portion 22 and the inside of the accommodation portion 23 in the width direction is in contact with the rear frame 10. The accommodation portion 23 may be directly fixed to the rear frame 10 and may be fixed to the rear frame 10 via the end plate.

An upper surface 23a of the accommodation portion 23 has the same height as that of the upper surface 22a of the bumper side portion 22 and the upper surface 23a extends in the forward-backward direction so as to be parallel to the horizontal surface. The portion on the upper surface 23a of the accommodation portion 23 and the portion on the upper surfaces 22a of the bumper side portions 22 become a side passage R2 which extends on the bumper side portions 22 and the accommodation portion 23 in the forward-backward direction. Similarly to the rear passage R1, a nonslip mat 24b is provided on the upper surfaces 22a of the bumper side portions 22 and the upper surface 23a of the accommodation portion 23 which become the side passage R2.

<Exterior Cover>

Figure 4:
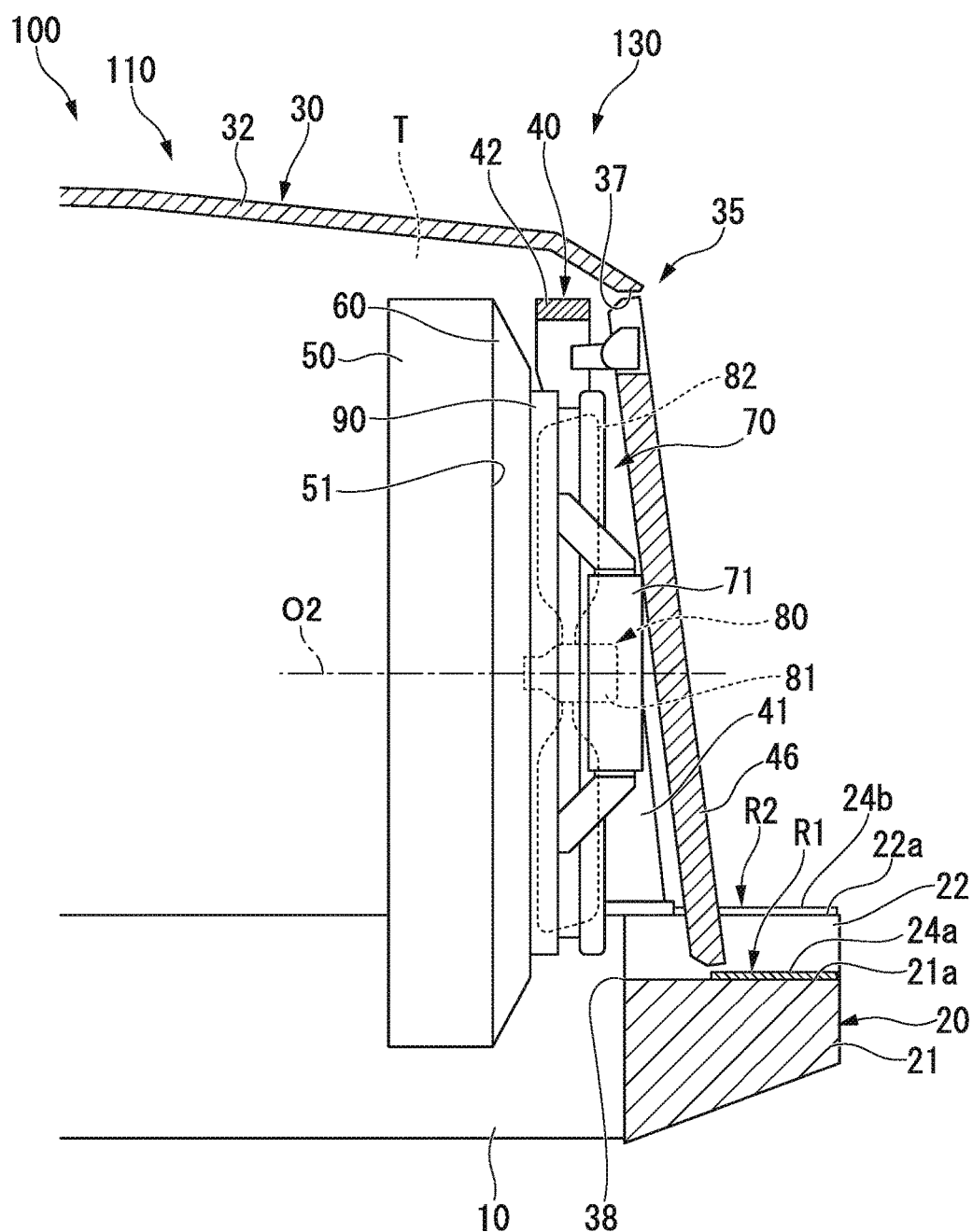
FIG. 4 is a side view of a cooling unit and a blower unit at a closed position in a state where the vehicle rear portion of the wheel loader as the work vehicle according to the embodiment of the present invention is shown in a vertical section.

As shown in FIGS. 2 to 4, the exterior cover 30 includes a pair of side covers 31 and a top cover 32.

The pair of side covers 31 has a panel shape which extends in a vertical direction and the forward-backward direction, and is provided with an interval therebetween in the width direction. Each of the lower ends of the pair of side covers 31 is fixed to each of the pair of corresponding rear frames 10 in the width direction.

The top cover 32 has a panel shape which extends in the forward-backward direction and the horizontal direction. Both ends of the top cover 32 in the width direction are connected to the upper ends of the pair of rear frames 10 in the forward-backward direction.

An internal space is formed inside the exterior cover 30 by the exterior cover 30 including the pair of side covers 31 and the top cover 32. The front side portion of the internal space becomes an engine room E, and the rear side portion thereof becomes a heat exchange room T. A partition plate may be provided between the engine room E and the heat exchange room T such that air can flow through a portion between the engine room E and the heat exchange room T, or the engine room E and the heat exchange room T may communicate with each other without providing the partition plate. A ventilation portion 33 through which air can flow between the inside of the engine room E and the outside of the exterior cover 30 is formed at a location of the side cover 31 corresponding to the engine room E.

An opening portion 35 which exposes the heat exchange room T toward the rear side is formed on the rear end of the exterior cover 30. The opening portion 35 has a rectangular shape in which the rear ends extending in the vertical direction in the side covers 31 become side edge portions 36, the rear end extending in the width direction in the top cover 32 becomes an upper edge portion 37, and the front end extending in the width direction on the upper surface 21a of the bumper center portion 21 becomes a lower edge portion 38. That is, the opening portion 35 is formed to be partitioned by the rear end of the exterior cover 30 and the front end of the bumper 20. The rear passage R1 is positioned to extend in the width direction along the lower edge portion 38 of the opening portion 35 on the rear side of the opening portion 35.

<Support Frame>

Figure 5:
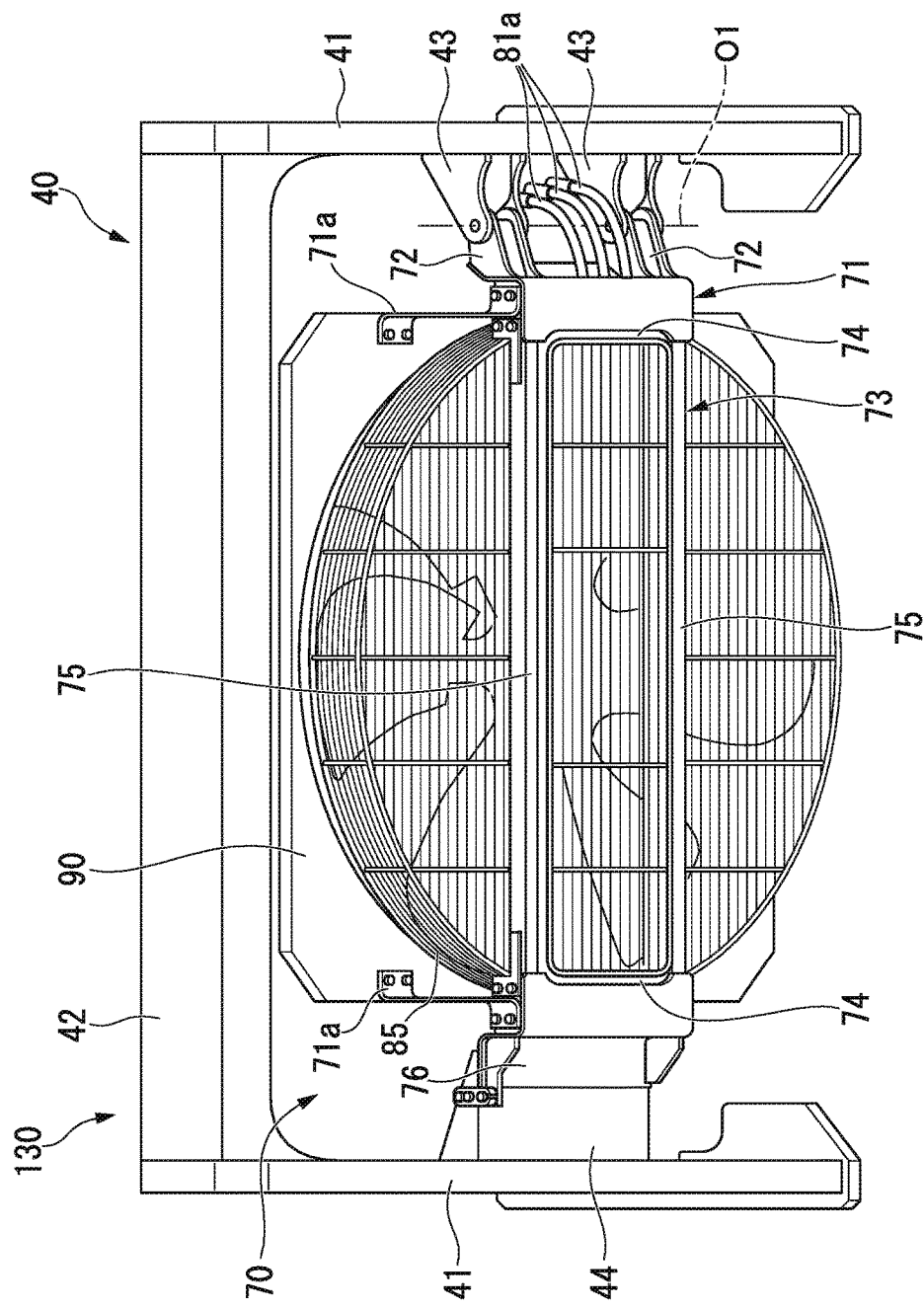
FIG. 5 is a perspective view when the blower unit and a support frame which supports the blower unit are viewed from the rear and above.
Figure 6:
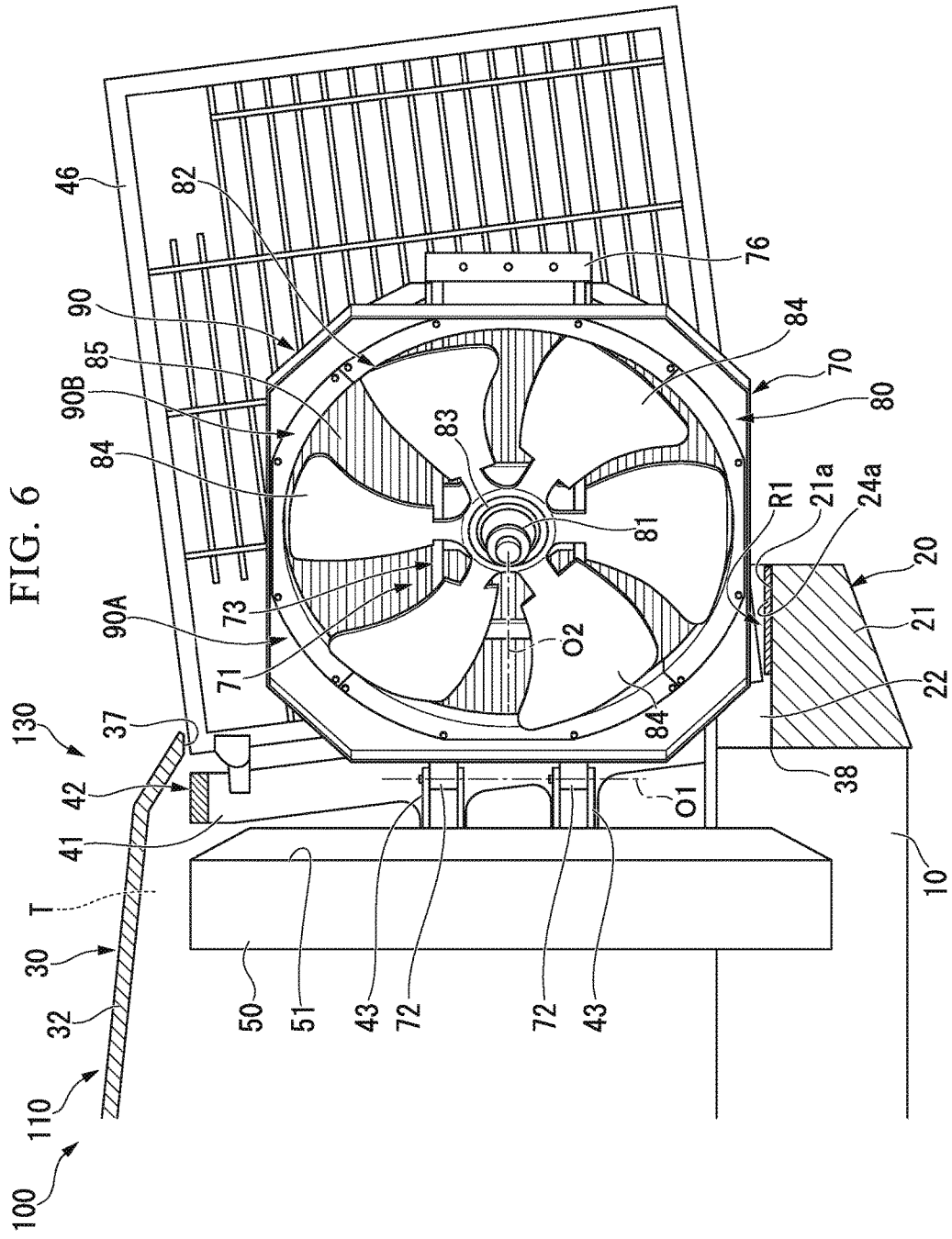
FIG. 6 is a side view of the cooling unit and the blower unit at an open position in a state where the vehicle rear portion of the wheel loader as the work vehicle according to the embodiment of the present invention is shown in a vertical section.

As shown in FIGS. 4 to 6, the support frame 40 is a gate-shaped member provided at a position on the rear side of the heat exchange room T inside the exterior cover 30, that is, a position on the opening portion 35 side. The support frame 40 has a function of supporting the blower unit 70. As shown in FIG. 5, the support frame 40 includes a pair of side frames 41, an upper frame (upper structure) 42, rotating brackets 43, and a fixing bracket 44.

The pair of side frames 41 has a bar shape extending in the vertical direction and is provided with an interval therebetween in the width direction. The lower end of each of the pair of side frames 41 is fixed to the corresponding rear frame 10 in the width direction. The pair of side frames 41 is disposed along the inner surfaces of the corresponding side covers 31. The side cover 31 may be fixed to the outside of the side frame 41 in the width direction. The pair of side frames 41 is provided along the side edge portions 36 of the opening portion 35 to approach the side edge portions 36.

As shown in FIG. 5, the upper frame 42 has a bar shape which extends over the pair of rear frames 10 in the width direction so as to connect the upper ends of the pair of rear frames 10 to each other. The top cover 32 of the exterior cover 30 may be fixed to the upper surface of the upper frame 42. The upper frame 42 is provided along the upper edge portion 37 of the opening portion 35 to approach the upper edge portion 37.

As shown in FIG. 5, each of the rotating brackets 43 has a function as a rotation support portion which rotatably supports the blower unit 70. The rotating brackets 43 are integrally provided on one (the side frame 41 on the right side in the width direction) of the pair of side frames 41. The rotating brackets 43 are provided to protrude further inside in the width direction from the surface of the side frame 41 facing the inside in the width direction. A plurality of (two in the present embodiment) rotating brackets 43 are provided at intervals therebetween in the vertical direction, that is, the extension direction of the side frame 41. Hole portions which extend along a rotation axis O1 extending in the vertical direction are formed in the rotating brackets 43. The hole portions of the plurality of rotating brackets 43 are positioned on the same rotation axis O1.

Since the rotating brackets 43 are disposed on one side in the width direction in the heat exchange room T, the rotation axis O1 passing through the rotating bracket 43 is disposed on one side in the width direction in the heat exchange room T. The rotation axis O1 extends in the vertical direction along the side edge portion 36 on one side of the opening portion 35 in the width direction.

As shown in FIG. 5, the fixing bracket 44 has a function of supporting the blower unit 70, which is detachably fixed to the fixing bracket 44, at a fixed state. The fixing bracket 44 is integrally provided on the other (the side frame 41 on the left side in the width direction) of the pair of side frames 41. The fixing bracket 44 is provided to protrude further inside from the surface of the side frame 41 facing the inside in the width direction.

<Grille>

As shown in FIGS. 3 and 4, the grille 46 is supported to the support frame 40, and the grille 46 is rotatably provided between a closed state where the opening portion 35 of the vehicle rear portion 130 is closed and an open state where the opening portion is open. The grille 46 has a lattice shape including a plurality of bar-shaped members, and the outline of the grille 46 is formed in a rectangular shape corresponding to the shape when the opening portion 35 is viewed in the forward-backward direction. The grille 46 is provided to be a posture which is inclined frontwards toward the front side in a state where the grille 46 closes the opening portion 35. The grille 46 is supported to be rotatable around an axis which extends in the vertical direction and is inclined frontwards with respect to one (the side frame 41 on the right side in the width direction) of the pair of side frames 41.

<Engine>

As shown in FIG. 2, the engine 47 is provided in the engine room E which is the front side portion of the internal space of the exterior cover 30. The engine 47 is driven by a fuel supplied from the fuel tank 170. A driving force of the engine 47 is transmitted to the front wheels 140 and the rear wheels 150 via a shaft or the like. Accordingly, the wheel loader 100 moves forward and backward. The driving force of the engine 47 is transmitted to a hydraulic pump (not shown). A hydraulic oil pressurized by the hydraulic pump is supplied to hydraulically driven devices such as the boom drive cylinder 183 or the bucket drive cylinder 184 via a hydraulic circuit. The engine 47 has a water-cooled structure.

<Cooling Unit>

As shown in FIGS. 2, 4, and 6, the cooling unit 50 is provided in the heat exchange room T inside the exterior cover 30. The cooling unit 50 is provided on the front side from the above-described opening portion 35 or support frame 40.

The cooling unit 50 includes cooling devices such as a radiator, an oil cooler, or an after-cooler, and an outer frame in which the cooling devices are accommodated. The outer frame has a rectangular parallelepiped shape in which the shape viewed from the front side and the rear side is a rectangular shape. A surface formed of the plurality of radiator tubes in the radiator is exposed to a rear surface 51 of the cooling unit 50 facing the rear side.

<Fixation Shroud>

As shown in FIGS. 4 and 6, the fixation shroud 60 is a member provided on the rear side of the cooling unit 50 in the heat exchange room T of the vehicle rear portion 130. The fixation shroud 60 is an annular member which extends in the forward-backward direction. The fixation shroud 60 has a function of guiding air, which flows inside from the front side of the cooling unit 50 and flows from the rear surface 51 of the cooling unit 50 to the rear side, further backward. The diameter of the inner peripheral surface of the fixation shroud 60 decreases toward the rear side. Accordingly, in a flow path inside the fixation shroud 60, a flow path cross-sectional area decreases toward the rear side. Similarly to the inner peripheral surface, the diameter of the outer peripheral surface of the fixation shroud 60 decreases toward the rear side.

Figure 8:
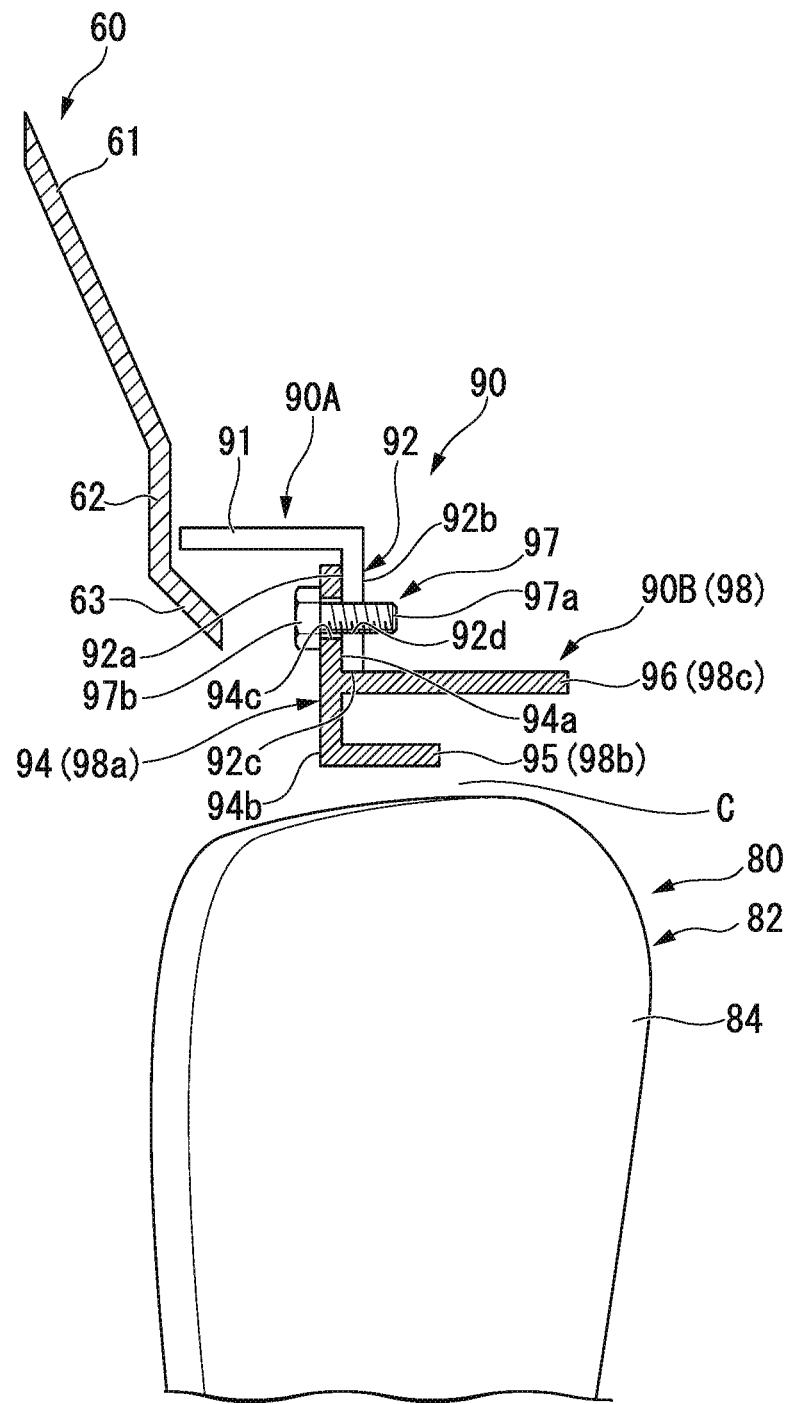
FIG. 8 is a longitudinal sectional view of a movable shroud in the blower unit of the wheel loader as the work vehicle according to the embodiment of the present invention.

As shown in FIG. 8, the fixation shroud 60 includes a first taper portion 61, a step portion 62, and a second taper portion 63.

The first taper portion 61 is the front portion of the fixation shroud 60, and the opening of the front portion has a shape according to the outline of the rear surface 51 of the cooling unit 50. The first taper portion 61 has a shape in which the flow path cross-sectional area decreases toward the rear side.

The step portion 62 has a flat-plate shape orthogonal to the forward-backward direction and connects the rear end of the first taper portion 61 and the front end of the second taper portion 63 to each other.

The front end of the second taper portion 63 is connected to the end portion on the inside in the radial direction of the step portion 62. The second taper portion 63 has a taper shape in which the flow path cross-sectional area decreases toward the rear side.

<Blower Unit>

As shown in FIG. 4, the blower unit 70 is supported to be rotatable around the rotation axis O1 with respect to the vehicle rear portion 130 on the rear side of the fixation shroud 60. The blower unit 70 has a function of supplying air for cooling the cooling unit 50 to the cooling unit 50. The blower unit 70 is supported to be rotatable between a closed position at which the blower unit 70 faces the rear surface 51 of the cooling unit 50 from the rear side and an open position at which the blower unit 70 exposes the rear surface of the cooling unit.

As shown in FIGS. 5 and 6, the blower unit 70 includes a movable bracket (structure member) 71, a fan 80, hydraulic pipes 81a, a guard portion 85, and a movable shroud 90.

<Movable Bracket>

The movable bracket 71 is rotatably supported with respect to the vehicle rear portion 130 and has a function of supporting the fan 80, the movable shroud 90, and the guard portion 85. As shown in FIG. 5, the movable bracket 71 includes rotation connection portions 72, a bracket body 73, and a fixing connection portion 76.

The rotation connection portions 72 are connected to the rotating brackets 43 of the support frame 40 to be rotatable around the rotation axis O1. In the present embodiment, the movable bracket 71 has a pair of rotation connection portions 72 corresponding to the pair of the rotating brackets 43. For example, each of the rotation connection portions 72 is rotatably connected to each rotating bracket 43 to be rotatable via a pin inserted into a hole portion along the rotation axis O1 of the rotating bracket 43.

The rotation connection portion 72 is integrally fixed to one end of the bracket body 73, and the bracket body 73 extends toward the outside in the radial direction of the rotation axis O1 from the one end.

As shown in FIGS. 4 and 5, a state where the bracket body 73 extends in the width direction is the closed position of the blower unit 70. As shown in FIG. 6, a state where the bracket body 73 rotates from the closed position toward the rear side of the vehicle rear portion 130 around the rotation axis O1 and the bracket body 73 diagonally extends to the rear side from the rotation axis O1 is the open position of the blower unit 70.

The fixing connection portion 76 is provided on the other end of the bracket body 73. As shown in FIG. 5, when the blower unit 70 is at the closed position, the fixing connection portion 76 detachably engages with the fixing bracket 44. Accordingly, the movable bracket 71 can switch between a fixed state where the fixing connection portion 76 engages with the fixing bracket 44 and a non-fixed state where the fixing connection portion 76 does not engage with the fixing bracket 44. For example, the fixing connection portion 76 can detachably engage with the fixing bracket 44 by well-known fixing means such as bolts or pins.

In addition, in the present embodiment, as shown in FIG. 5, when in the closed position, the bracket body 73 has a frame shape including a pair of vertical frame portions 74 which is disposed so as to be separated from each other on the right and left sides in the width direction and extends in the vertical direction and a pair of horizontal frame portions 75 which connects the pair of the vertical frame portions 74 to each other in the width direction and is disposed so as to be separated from each other in the up-and-down direction. The rotation connection portions 72 are provided on one of the pair of vertical frame portions 74, and the fixing connection portion 76 is provided on the other.

<Fan>

As shown in FIGS. 4 and 8, the fan 80 includes a hydraulic motor 81 and a fan body 82.

The hydraulic motor 81 is rotationally driven by the hydraulic oil supplied via the hydraulic pipes 81a from the hydraulic pump. The hydraulic motor 81 is fixed to the bracket body 73. The hydraulic motor 81 is fixed to a portion between the pair of horizontal frame portions 75 in the bracket body 73 of the movable bracket 71. The hydraulic motor 81 is disposed to protrude from the bracket body 73 toward the front side. The hydraulic motor 81 is configured such that a drive shaft rotates around an axis O2 when the hydraulic oil is supplied to the hydraulic motor 81. In a case where the blower unit 70 is at the closed position, the axis O2 of the drive shaft of the hydraulic motor 81 coincides with the forward-backward direction.

The fan body 82 is rotationally driven by the hydraulic motor 81 to blow air. As shown in FIG. 8, the fan body 82 includes an attachment portion 83 attached to the drive shaft of the hydraulic motor 81, and a plurality of (six in the present embodiment) blades 84 fixed to the outer peripheral portion of the attachment portion 83 and provided at intervals therebetween in the peripheral direction of the drive shaft. The fan body 82 is rotated around the axis O2 by the driving of the hydraulic motor 81.

In a case where the blower unit 70 is at the closed position, the fan 80 of the blower unit 70 faces the rear surface 51 of the cooling unit 50 from the rear side. If the hydraulic motor 81 is driven in this state, the fan body 82 rotates, and a flow of air from the front side toward the rear side is generated.

<Hydraulic Pipe>

Figure 7:
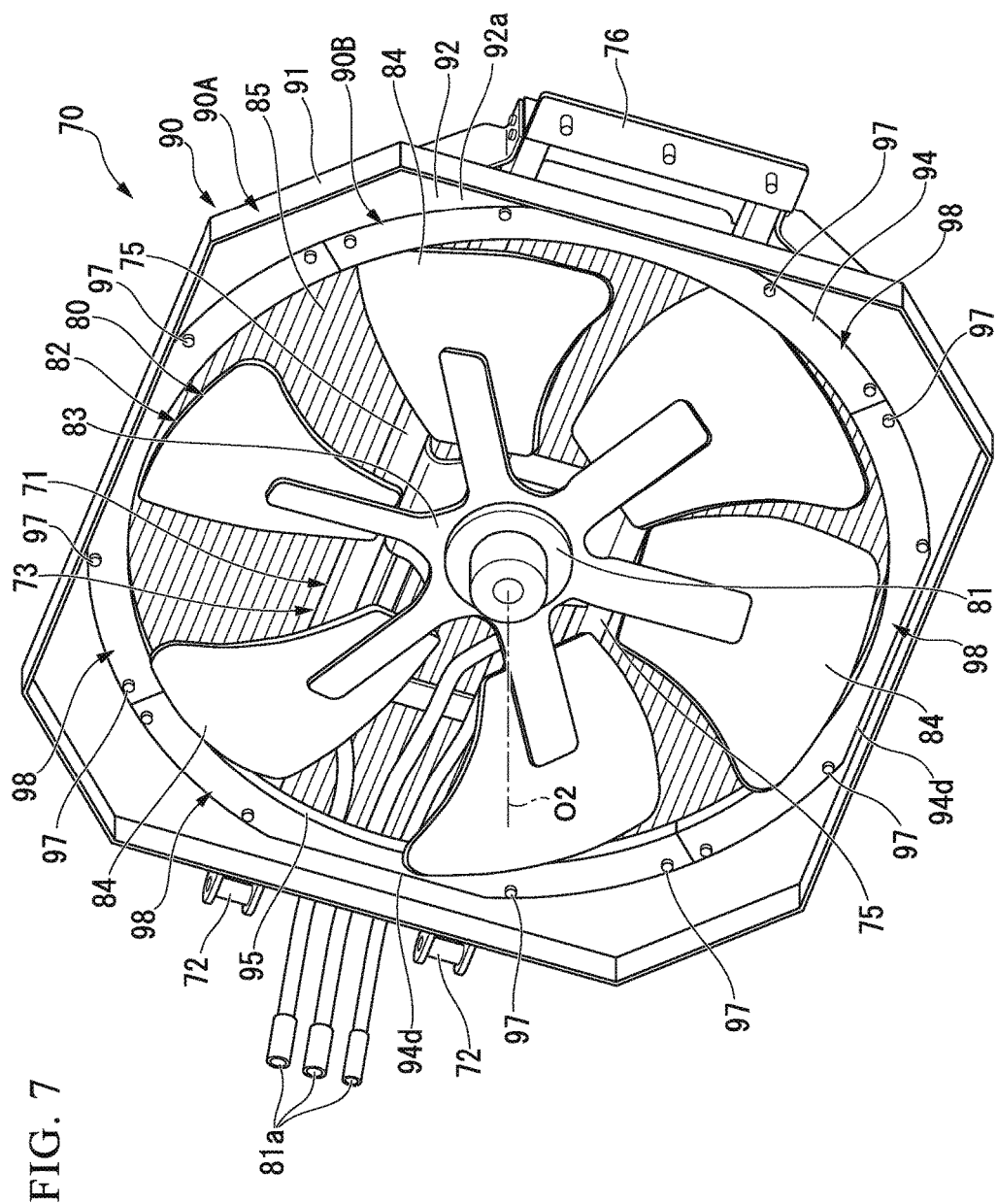
FIG. 7 is a perspective view of the blower unit of the wheel loader as the work vehicle according to the embodiment of the present invention.

As shown in FIGS. 5 and 7, three hydraulic pipes 81a are connected to the hydraulic motor 81. Each hydraulic pipe 81a extends from the hydraulic motor 81 to the rotation axis O1 side along the bracket body 73. For example, the hydraulic pipes 81a extend to the outside of the blower unit via hole portions which are formed in the rotation connection portion 72. The hydraulic pipes 81a are connected to the hydraulic circuit. The three hydraulic pipes 81a are used as a pipe for supplying oil, a pipe for discharging oil, and a pipe for brake pilot.

<Guard Portion>

As shown in FIGS. 4, 5 and 8, the guard portion 85 is a member which covers the fan 80 from the rear side and the outside of the fan 80 in the radial direction. Similarly to the grille 46 portion, the guard portion 85 has a lattice shape including a plurality of bar-shaped members and is integrally fixed to the movable bracket 71. The guard portion 85 ensures safety when the fan 80 rotates while the obstruction in the flow of air is prevented.

<Movable Shroud>

The movable shroud 90 has a function of covering at least a portion of the fan body 82 from the outer peripheral side and introduces air to the fan body 82. The movable shroud 90 is supported to the movable bracket 71 such that the movable shroud 90 is positioned on the front side (the inside in the rotation direction of the blower unit) which becomes one side in the direction of the axis of the movable bracket 71 when the blower unit 70 is at the closed position. The movable shroud 90 includes a shroud body 90A and a ring shroud 90B.

As shown in FIGS. 7 and 8, the shroud body 90A is a member which surrounds the fan 80 from the outer peripheral side. The shroud body 90A is supported so as to face the movable bracket 71 from one side in the axis O2 direction. The shroud body 90A includes a connection tubular portion 91, a frame plate portion 92, and bolts (fixing portion) 97.

The connection tubular portion 91 is a portion on the front side of the shroud body 90A, and, when the blower unit is at the closed position, the front end of the connection tubular portion 91 comes into contact with the step portion 62 of the fixation shroud 60 over the entire region in the peripheral direction via a seal member (not shown), for example. The connection tubular portion 91 has a tubular shape which extends to have a constant shape from the front end toward the rear side. The shape of the connection tubular portion 91 when viewed in the direction of the axis O2 becomes the shape according to the opening shape of the rear end of the fixation shroud 60. In the present embodiment, since the opening shape of the rear end of the fixation shroud 60 is an octagonal shape, the connection tubular portion 91 also has an octagonal shape when viewed in the direction of the axis O2. That is, the connection tubular portion 91 has a tubular shape in which the cross section is octagonal.

In addition, a seal member which seals a gap between the front end of the connection tubular portion 91 and the fixation shroud 60 may be provided when the blower unit 70 is at the closed position. For example, the seal member may be an elastic member which is provided on the front end of the connection tubular portion 91 in the peripheral direction.

The frame plate portion 92 has a flat-plate shape which extends in a direction orthogonal to the axis O2, and the end portion on the outside in the radial direction is connected to the rear end of the connection tubular portion 91. The frame plate portion 92 extends toward the inside in the radial direction from a connection location between the connection tubular portion 91 and the frame plate portion 92 such that the opening area on the rear side of the connection tubular portion 91 decreases.

The surface of the frame plate portion 92 facing the front side becomes a fixation surface 92a for fixing the ring shroud 90B. As shown in FIG. 5, the surface of the frame plate portion 92 facing the rear side (the outside in the rotation direction of the blower unit) which becomes the other side in the direction of the axis O2 becomes an outer surface 92b fixed to the movable bracket 71 via a fixing member 71a. An opening-hole portion 92c having a circular shape with the axis O2 as a center is formed so as to penetrate in the direction of the axis O2 inside the frame plate portion 92.

A plurality of bolt fixing-holes 92d are formed at intervals therebetween in the peripheral direction in the portion of the frame plate portion 92 on the outer peripheral side of the opening-hole portion 92c. Each of the bolt fixing-holes 92d penetrates the frame plate portion 92 in the direction of the axis O2, and a female screw is formed on the inner peripheral surface of the bolt fixing-hole.

As shown in FIG. 7, the movable bracket 71 extends over both ends in the width direction (right-left direction) of the frame plate portion 92 on the other side of the frame plate portion 92 in the direction of the axis O2. That is, the movable bracket 71 extends over both sides of the opening-hole portion 92c so as to cross the opening-hole portion 92c opened at front, rear, right, and left.

In this way, the shroud body 90A is supported to the movable bracket 71 via the fixing member 71a in a state where the shroud body 90A faces the movable bracket 71 from one side in the direction of the axis O2.

Next, the ring shroud 90B will be described. The ring shroud 90B is an annular member and is provided between the shroud body 90A and the outer peripheral end of the fan 80.

As shown in FIGS. 6 to 8, the ring shroud 90B includes a flange portion 94, a first tubular portion (tubular portion) 95, and a second tubular portion 96.

For example, the material which configures the ring shroud 90B can use a steel plate. Each of the flange portion 94, the first tubular portion 95, and the second tubular portion 96 is cut from a steel plate according to predetermined dimensions and is prepared by performing predetermined drilling and bending on each cut steel plate. Thereafter, for example, the flange portion 94, the first tubular portion 95, and the second tubular portion 96 are integrated with each other by welding. In addition, the ring shroud 90B may be formed of a resin material by injection molding or the like.

The flange portion 94 has a plate shape having a surface orthogonal to the direction of the axis O2 and is a member extending in an annular shape with the axis O2 as a center. An outer diameter of the flange portion 94 is set to be larger than an inner diameter of the opening-hole portion 92c of the frame plate portion 92. An inner diameter of the flange portion 94 is set to be smaller than the inner diameter of the opening-hole portion 92c of the frame plate portion 92. The surface of the flange portion 94 facing the rear side becomes an abutment surface 94a having a planar shape and abutting on the fixation surface 92a of the frame plate portion 92. Bolt through-holes 94c are formed in the flange portion 94, and the bolt through-holes 94c penetrate in the direction of the axis O2 from the abutment surface 94a to a front surface 94b positioned on a side opposite to the abutment surface 94a and facing the front side. A plurality of bolt through-holes 94c are formed at intervals therebetween in the peripheral direction.

In addition, as shown in FIG. 7, a linear portion 94d which is linearly notched so as to avoid interference with the connection tubular portion 91 of the shroud body 90A is provided on the outer edges of the upper end, the lower end, and the end portions in the width direction of the flange portion 94.

The first tubular portion 95 is a cylindrical member which extends in the forward-backward direction with the axis O2 as a center. The front end of the first tubular portion 95 is connected to the end portion on the inside in the radial direction of the flange portion 94 in the peripheral direction. Moreover, the flange portion 94 has an annular shape which is formed so as to extend from the front end of the first tubular portion 95 to the outer peripheral side. The inner peripheral surface of the first tubular portion 95 faces the outer edge of the blade 84 becoming the outer peripheral end of the fan 80 in the radial direction. A clearance C is formed between the inner peripheral surface of the first tubular portion 95 and the outer peripheral end of the fan 80. A position adjustment work of the ring shroud 90B is performed so as to adjust the dimensions of the clearance C.

As shown in FIG. 8, the second tubular portion 96 is a cylindrical member extending in the forward-backward direction with the axis O2 as a center. An inner diameter and an outer diameter of the second tubular portion 96 are larger than an inner diameter and an outer diameter of the first tubular portion 95. The front end of the second tubular portion 96 is connected to be integrated with the flange portion 94 on the abutment surface 94a of the flange portion 94 such that the second tubular portion 96 is coaxial with the first tubular portion 95. The connection location of the second tubular portion 96 with respect to the abutment surface 94a is positioned further inside in the radial direction of the axis O2 than the bolt through-hole 94c. The rear end of the second tubular portion 96 protrudes further backward (the other side in the direction of the axis O2) than the rear end of the first tubular portion 95.

As shown in FIG. 8, each of the bolts 97 has a function of fixing the ring shroud 90B to the shroud body 90A from the side opposite to the side on which the shroud body 90A is supported to the movable bracket 71. In the present embodiment, since the shroud body 90A is supported to the movable bracket 71 from the rear side, the bolts 97 fix the ring shroud 90B to the shroud body 90A from the front side.

Each of the bolts 97 includes a shaft portion 97a and the head portion 97b. The shaft portion 97a is inserted into the bolt through-hole 94c of the ring shroud 90B and fastened to the bolt fixing-hole 92d of the shroud body 90A in a state where the abutment surface 94a of the flange portion 94 of the ring shroud 90B abuts on the fixation surface 92a of the frame plate portion 92. In this state, the head portion 97b abuts on the side (front side) opposite to the side, on which the shroud body 90A is supported by the movable bracket 71, with respect to the front surface 94b of the flange portion 94 of the ring shroud 90B.

An inner diameter of the bolt through-hole 94c is set to be larger than an outer diameter of the shaft portion 97a. An outer diameter of the head portion 97b of the bolt 97 is set to be larger than an inner diameter of the bolt through-hole 94c.

As shown in FIG. 7, the above-described ring shroud 90B is configured of a plurality of segment pieces 98 formed by the segmentation of the ring shroud 90B in the peripheral direction. As shown in FIG. 8, the segment pieces 98 includes flange forming portions 98a which are connected to each other in the peripheral direction to form the flange portion 94, first cylinder formation portions 98b which are connected to each other in the peripheral direction to form the first tubular portion 95, and second cylindrical formation portions 98c which are connected to each other in the peripheral direction to form the second tubular portion 96. Each of the flange formation portions 98a, the first cylinder formation portions 98b, and the second cylinder formation portions 98c extends in an arc shape with the axis O2 as a center when viewed in the direction of the axis O2.

In the present embodiment, the ring shroud 90B is configured of four segment pieces 98 positioned up, down, right, and left. The bolt through-hole 94c is formed in each of the segment pieces 98. Accordingly, each segment piece 98 can be separately attached to the shroud body 90A.

<Operation and Effect>
When the wheel loader 100 is operated, as shown in FIG. 4, the blower unit 70 is at the closed position, and the opening portion 35 of the vehicle rear portion 130 is closed by the grille 46. If the fan body 82 is rotated by driving the hydraulic motor 81 of the blower unit 70, ventilation is performed from the inside of the heat exchange room T formed by the exterior cover 30 toward the rear side via the opening portion 35. Accordingly, air which flows into the engine room E or the heat exchange room T via the ventilation portion 33 of the exterior cover 30 flows toward the rear side so as to pass through the cooling unit 50 inside the heat exchange room T. The air in which the temperature increases by cooling the cooling unit 50 flows through the flow path, which is formed by the fixation shroud 60 and the movable shroud 90, toward the rear side via the fan 80. Thereafter, the air is discharged from the opening portion 35 of the vehicle rear portion 130 via the grille 46.

In the present embodiment, blowing efficiency is improved by setting the clearance C between the ring shroud 90B and the outer peripheral end of the fan 80 to an appropriate value. Moreover, in the second tubular portion 96 of the ring shroud 90B, a decrease in the blowing efficiency is prevented by appropriately processing the vortex generated on the rear end of the first tubular portion 95. The value of the clearance C between the ring shroud 90B and the outer peripheral end of the fan 80 is adjusted when the ring shroud 90B is attached to the shroud body 90A.

Since the wheel loader 100 loads earth and sand, crushed stones, or the like to transport these, if the wheel loader 100 is used in the work, the wheel loader 100 is exposed to an environment where there are clouds of dust. Accordingly, the dust is attached to the blower unit 70 or the cooling unit 50. If the earth and sand is attached to the drive shafts of the fan 80 of the blower unit 70 or the hydraulic motor 81, blowing efficiency decreases. If the earth and sand is attached to the cooling unit 50, heat exchange efficiency decreases. Particularly, if earth and sand is attached to a gap between the radiation tubes of the radiator and clogging occurs, it is not possible to appropriately cool the cooling water of the engine 47. In addition, clogging easily occurs in the corner portions of the rear surface 51 of the cooling unit 50 which is deviated from the facing range of the fan 80. Therefore, cleaning is performed as part of a maintenance work with respect to the blower unit 70 and the cooling unit 50. Moreover, the fan 80 or the blade 84 may be attached and detached in order to perform cleaning or replacement of the fan 80 or the blade 84 as one of the maintenance work.

When the maintenance work is performed, as shown in FIG. 6, a worker rotates the grille 46 from the closed state to the open state and rotates the blower unit to the open position. Moreover, the maintenance work such as removal of the earth and sand is performed on the blower unit 70 positioned at the open position by the worker on the rear passage R1. In addition, the maintenance work such as removal of the earth and sand is performed on the fixation shroud 60 which is exposed to the rear side when the blower unit 70 is at the open position and the rear surface 51 of the cooling unit 50 which is exposed via the opening of the rear end of the fixation shroud 60 by the worker on the rear passage R1.

Here, when the maintenance work is performed, the position adjustment of the ring shroud 90B is performed in accordance with the maintenance work. That is, the clearance C is set to an optimum value at the time of an initial setting. However, when the position of the axis O2 is deviated according to the operation of the fan 80, or when the outer peripheral end of the fan 80, that is, the blade 84 is abraded, the clearance C is optimized by performing the position adjustment of the ring shroud 90B. When the fan 80 or the blade 84 is attached and detached, it is necessary to perform the position adjustment of the ring shroud 90B.

The worker on the rear passage R1 performs the position adjustment of the ring shroud 90B in a state where the blower unit 70 is at the open position. That is, the worker on the rear passage R1 accesses the blower unit 70 from one side in the direction of the axis O2. In addition, the position of the ring shroud 90B is finely adjusted in a state where the bolts 97 which fix the ring shroud 90B to the shroud body 90A are loosened. Particularly, in the present embodiment, since the ring shroud 90B is configured of the plurality of segment pieces 98, the position of each segment piece 98 is finely adjusted.

After the maintenance ends, the blower unit 70 and the grille 46 are returned to the original positions by the worker on the rear passage R1. Accordingly, the wheel loader 100 can be restarted.

According to the above-described wheel loader 100, the movable bracket 71 and the bolts 97 are positioned on the sides opposite to each other when viewed from the shroud body 90A. That is, the movable bracket 71 which is the structure member supporting the shroud body 90A is positioned on the side opposite to each bolt 97 in a state where the shroud body 90A is interposed therebetween when viewed in the attachment direction of each bolt 97. In the present embodiment, the head portion 97b of the bolt 97 which is the fixing portion is positioned on one side (front side) in the direction of the axis O2 of the shroud body 90A, and the movable bracket 71 is positioned on the other side (rear side) in the direction of the axis O2 of the shroud body 90A.

Accordingly, when the ring shroud 90B is fixed to the shroud body 90A by the bolts 97, the movable bracket 71 does not interfere with the work. Accordingly, it is possible to easily perform the fixation work of the ring shroud 90B with respect to the shroud body 90A or the position adjustment work of the ring shroud 90B.

Since the ring shroud 90B is configured of the plurality of segment pieces 98 which are segmented in the peripheral direction, it is possible to individually adjust the clearance C between the outer peripheral end of the fan 80 and the ring shroud 90B for each segment piece 98. Accordingly, it is possible to set the clearance C to an optimum value at each position of the ring shroud B in the peripheral direction.

The worker can adjust the fixation position of the flange portion 94 in a state were the flange portion 94 of the ring shroud 90B abuts on the shroud body 90A from the side (front side) opposite to the side on which the shroud body 90A is supported by the movable bracket 71 when viewed from the shroud body 90A. Accordingly, it is possible to easily perform a fine adjustment of the position of the ring shroud 90B. The worker inserts the bolts 97 into the bolt through-holes 94c of the ring shroud 90B from the front side which becomes one side in the direction of the axis O2, and thereafter, the worker can easily fix the ring shroud 90B to the shroud body 90A by fastening the bolts 97 to the bolt through-holes 94c of the shroud body 90A.

Since the inner diameter of each bolt through-hole 94c of the ring shroud 90B is larger than the outer diameter of the shaft portion 97a of each bolt 97, it is possible to finely adjust the position of the ring shroud 90B within a range of the difference between the inner diameter and the outer diameter. Accordingly, it is possible to more strictly perform the adjustment of the clearance C between the ring shroud 90B and the outer peripheral end of the fan 80.

The hydraulic pipes 81a, through which hydraulic oil is supplied to and discharged from the hydraulic motor 81 of the fan 80, are disposed on the rear side of the shroud body 90A. That is, the hydraulic pipes 81a are positioned on the side opposite to the bolts 97 in a state where the shroud body 90A is interposed therebetween when viewed from the bolts 97. Accordingly, when the position adjustment work of the ring shroud 90B is performed from the front side, the hydraulic pipes 81a do not interfere with the work.

Since the rear passage R1 is formed within the rotation range of the blower unit, when the blower unit 70 is open, the worker can access the ring shroud 90B on the rear passage R1. Accordingly, it is possible to easily perform the position adjustment work of the ring shroud 90B.

<Other Embodiments>

Hereinbefore, the embodiment of the present invention is described. However, the present invention is not limited to this and can be appropriately modified within a scope which does not depart from the technical scope of the present invention.

In the embodiment, the movable bracket 71 is disposed on the rear side (outside in the rotation direction) of the shroud body 90A, and the ring shroud 90B is fixed to the shroud body 90A by the bolts 97 from the front side (inside in the rotation direction) of the shroud body 90A.

Figure 9:
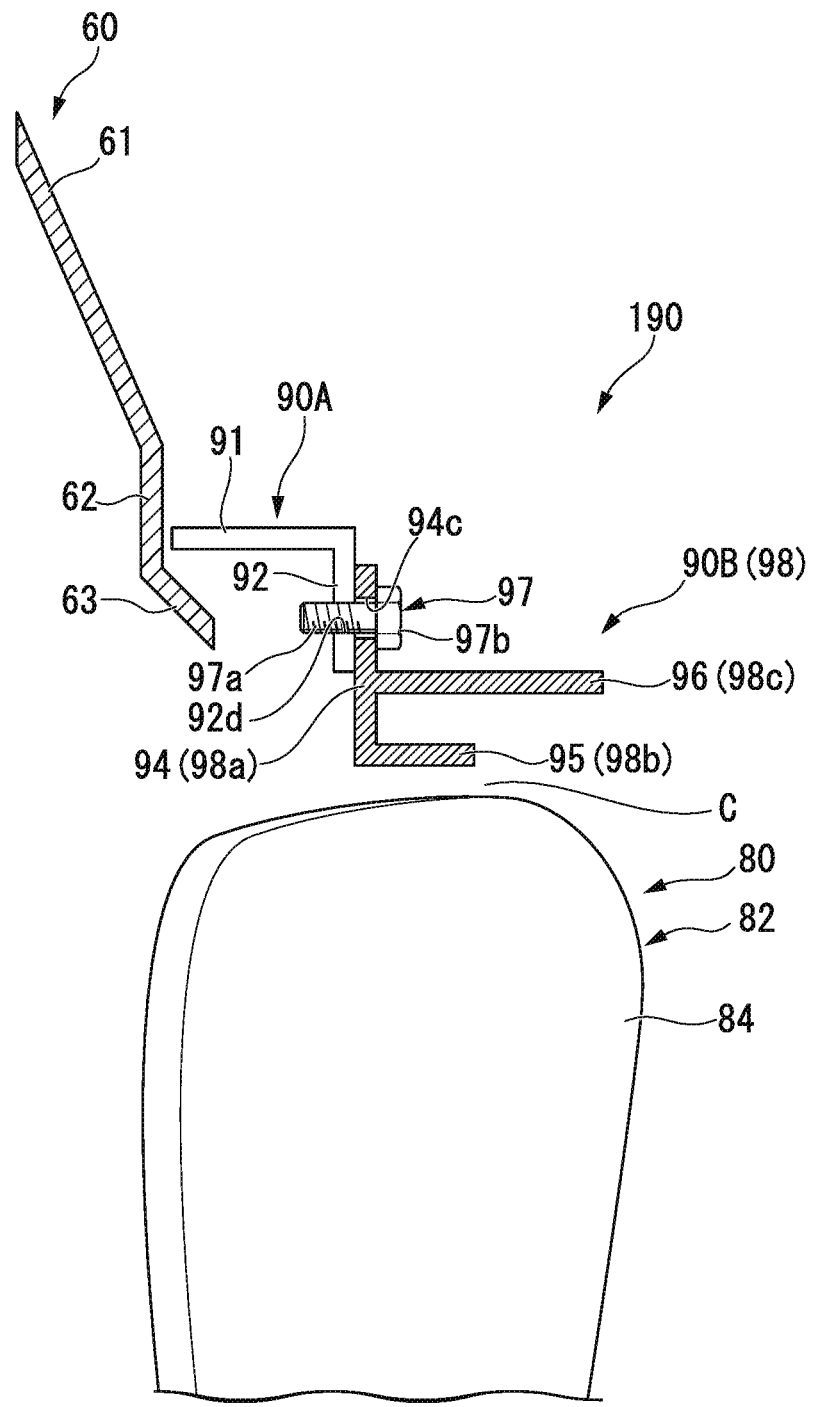
FIG. 9 is a longitudinal sectional view of a movable shroud in a blower unit of a wheel loader as a work vehicle according to a modification example of the present invention.

In addition, for example, in the movable shroud 190 of a modification example shown in FIG. 9, the ring shroud 90B may be fixed to the shroud body 90A by the bolts 97 from the rear side (outside in the rotation direction) of the shroud body 90A. In this case, the movable bracket 71 or the hydraulic pipes 81a are disposed on the front side (inside in the rotation direction) of the shroud body 90A. That is, any configuration may be adopted as long as the side to which the ring shroud 90B is fixed by the bolts 97 and the side on which the movable bracket 71 or the hydraulic pipes 81a is disposed are opposite to each other in the state where the shroud body 90A is interposed therebetween. Accordingly, similarly to the embodiment, it is possible to prevent the movable bracket 71 or the hydraulic pipes 81a from interfering with the position adjustment work of the ring shroud 90B.

In the embodiment, the example which includes the movable bracket 71 as the structure member for supporting the shroud body 90A is described. However, the present invention is not limited to the movable bracket 71, and other structure members for supporting the shroud body 90A may be provided.

In the embodiment, the example which adopts the bolts 97 as the fixing portion for fixing the ring shroud 90B to the shroud body 90A is described. However, the present invention is not limited to the bolts 97 as the fixing portion, and other configurations capable of fixing the ring shroud 90B to the shroud body 90A may be adopted. For example, the ring shroud 90B is not fixed by the bolts 97, and the ring shroud 90B may be fixed to the shroud body 90A by fixing other members covering the ring shroud 90B using the bolts 97. In addition, the ring shroud 90B may be fixed to the shroud body 90A via an adhesive agent.

In the embodiment, the example which adopts the hydraulic motor 81 as the drive source of the fan 80 is described. However, an electric motor may be adopted. In this case, preferably, a power source cable of the fan 80 is disposed on the same side as the structure member such as the movable bracket 71 when viewed from the shroud body 90A.

In the embodiments, the wheel loader 100 is described as one example of the work vehicle of the present invention. However, for example, the present invention may be applied to other work vehicles such as a motor grader as the work vehicle. In addition, the present invention may be applied to other work vehicles including the cooling unit 50 and the blower unit 70.

INDUSTRIAL APPLICABILITY

According to the work vehicle having the above-described aspects, it is possible to easily perform the clearance adjustment between the shroud and the fan.

REFERENCE SIGNS LIST

10: rear frame, 20: bumper, 21: bumper center portion, 21a: upper surface, 22: bumper side portion, 22a: upper surface, 23: accommodation portion, 23a: upper surface, 24a: nonslip mat, 24b: nonslip mat, 30: exterior cover, 31: side cover, 32: top cover, 33: ventilation portion, 35: opening portion, 36: side edge portion, 37: upper edge portion, 38: lower edge portion, 40: support frame, 41: side frame, 42: upper frame, 43: rotating bracket, 44: fixing bracket, 46: grille, 47: engine, 50: cooling unit, 51: rear surface, 60: fixation shroud, 61: first taper portion, 62: step portion, 63: second taper portion, 70: blower unit, 71: movable bracket (structure member), 71a: fixing member, 72: rotation connection portion, 73: bracket body, 74: vertical frame portion, 75: horizontal frame portion, 76: fixing connection portion, 80: fan, 81: hydraulic motor, 81a: hydraulic pipe, 82: fan body, 83: attachment portion, 84: blade, 85: guard portion, 90: movable shroud, 90A: shroud body, 90B: ring shroud, 91: connection tubular portion, 92: frame plate portion, 92a: fixation surface, 92b: outer surface, 92c: opening-hole portion, 92d: bolt fixing-hole, 94: flange portion, 94a: abutment surface, 94b: front surface, 94c: bolt through-hole, 95: first tubular portion (tubular portion), 96: second tubular portion, 97: bolt (fixing portion), 97a: shaft portion, 97b: head portion, 98: segment piece, 98a: flange forming portion, 98b: first cylinder formation portion, 98c: second cylinder formation portion, 100: wheel loader, 110: vehicle body, 120: vehicle front portion, 130: vehicle rear portion, 140: front wheel, 150: rear wheel, 160: cab, 170: fuel tank, 180: work vehicle, 181: boom, 182: bucket, 183: boom drive cylinder, 184: bucket drive cylinder, 190: movable shroud, R1: rear passage, R2: side passage, E: engine room, T: heat exchange room, O1: rotation axis, O2: axis

The invention claimed is:

1. A work vehicle, comprising:
a vehicle body that includes a heat exchange room in which an opening portion facing a rear side is formed;
a cooling unit that is provided in the heat exchange room and includes a rear surface facing the rear side; and
a blower unit that includes:
   a structure member rotatably supported to the vehicle body at one end of the vehicle body in a width direction of the vehicle body around a rotation axis extending in a vertical direction,
   a fan supported to the structure member and rotationally driven around an axis, and
   a movable shroud covering the fan from an outer peripheral side,
wherein the blower unit is rotatable between a closed position and an open position, the closed position being a position at which the blower unit faces the rear surface of the cooling unit and the axis is positioned in a forward-backward direction of the vehicle body, the open position being the position at which the blower unit exposes the rear surface of the cooling unit,
wherein the movable shroud includes
   a shroud body that is supported so as to face the structure member and surrounds the fan,
   a ring shroud that is formed in an annular shape and is provided between the shroud body and an outer peripheral end of the fan, and
   a fixing portion that fixes the ring shroud to the shroud body from a side opposite to a side on which the shroud body is supported to the structure member.

2. The work vehicle according to claim 1,
wherein the ring shroud is configured of a plurality of segment pieces formed by a segmentation of the ring shroud in a peripheral direction, and
wherein the fixing portion fixes each segment piece to the shroud body.

3. The work vehicle according to claim 2,
wherein the ring shroud includes
a tubular portion that includes an inner peripheral surface facing the outer peripheral end of the fan in the peripheral direction, and
a flange portion that is provided to extend from the tubular portion to the outer peripheral side, abuts on the shroud body from the opposite side, and is fixed to the shroud body by the fixing portion.

4. The work vehicle according to claim 3,
wherein the shroud body includes a bolt fixing-hole extending in a direction of the axis,
wherein the flange portion of the ring shroud includes a bolt through-hole penetrating the flange portion in the direction of the axis, and
wherein the fixing portion is a bolt that includes a shaft portion penetrating the bolt through-hole and fixed to the bolt fixing-hole.

5. The work vehicle according to claim 4,
wherein an inner diameter of the bolt through-hole is larger than an outer diameter of the shaft portion, and
wherein the bolt abuts on the flange portion from the opposite side, and further includes a head portion having an outer diameter that is larger than the inner diameter of the bolt through-hole.

6. The work vehicle according to claim 3,
wherein the fan includes
a hydraulic motor that is driven by a hydraulic pressure, and
a fan body that includes a plurality of blades fixed to a drive shaft of the hydraulic motor,
wherein the work vehicle further includes a hydraulic pipe which is provided on the other side of the shroud body in the direction of the axis and through which a hydraulic pressure is supplied to the hydraulic motor.

7. The work vehicle according to claim 2,
wherein the fan includes
a hydraulic motor that is driven by a hydraulic pressure, and
a fan body that includes a plurality of blades fixed to a drive shaft of the hydraulic motor,
wherein the work vehicle further includes a hydraulic pipe which is provided on the other side of the shroud body in the direction of the axis and through which a hydraulic pressure is supplied to the hydraulic motor.

8. The work vehicle according to claim 2,
wherein the vehicle body includes
a pair of rear frame that extends in the forward-backward direction at intervals therebetween in a width direction of the vehicle body;
an exterior cover that is provided above the rear frame and in which the heat exchange room is formed inside the exterior cover; and
a bumper that is provided to extend in the width direction over the pair of rear frames on the rear sides of the rear frames, includes an upper surface which becomes the rear passage, and partitions and forms the opening portion along with the exterior cover, wherein the shroud body is supported to the structure member from the rear side when the blower unit is at the closed position, and wherein the fixing portion fixes the shroud body to the ring shroud from the front side when the blower unit is at the closed position.

9. The work vehicle according to claim 2, wherein the ring shroud has four segment pieces.

10. The work vehicle according to claim 1, wherein the ring shroud includes a tubular portion that includes an inner peripheral surface facing the outer peripheral end of the fan in the peripheral direction, and a flange portion that is provided to extend from the tubular portion to the outer peripheral side, abuts on the shroud body from the opposite side, and is fixed to the shroud body by the fixing portion.

11. The work vehicle according to claim 10, wherein the shroud body includes a bolt fixing-hole extending in a direction of the axis, wherein the flange portion of the ring shroud includes a bolt through-hole penetrating the flange portion in the direction of the axis, and wherein the fixing portion is a bolt that includes a shaft portion penetrating the bolt through-hole and fixed to the bolt fixing-hole.

12. The work vehicle according to claim 11, wherein an inner diameter of the bolt through-hole is larger than an outer diameter of the shaft portion, and wherein the bolt abuts on the flange portion from the opposite side, and further includes a head portion having an outer diameter that is larger than the inner diameter of the bolt through-hole.

13. The work vehicle according to claim 12, wherein the fan includes a hydraulic motor that is driven by a hydraulic pressure, and a fan body that includes a plurality of blades fixed to a drive shaft of the hydraulic motor, wherein the work vehicle further includes a hydraulic pipe which is provided on the other side of the shroud body in the direction of the axis and through which a hydraulic pressure is supplied to the hydraulic motor.

14. The work vehicle according to claim 12, wherein the vehicle body includes a pair of rear frame that extends in the forward-backward direction at intervals therebetween in a width direction of the vehicle body;

an exterior cover that is provided above the rear frame and in which the heat exchange room is formed inside the exterior cover; and a bumper that is provided to extend in the width direction over the pair of rear frames on the rear sides of the rear frames, includes an upper surface which becomes the rear passage, and partitions and forms the opening portion along with the exterior cover, wherein the shroud body is supported to the structure member from the rear side when the blower unit is at the closed position, and wherein the fixing portion fixes the shroud body to the ring shroud from the front side when the blower unit is at the closed position.

15. The work vehicle according to claim 11, wherein the fan includes a hydraulic motor that is driven by a hydraulic pressure, and a fan body that includes a plurality of blades fixed to a drive shaft of the hydraulic motor, wherein the work vehicle further includes a hydraulic pipe which is provided on the other side of the shroud body in the direction of the axis and through which a hydraulic pressure is supplied to the hydraulic motor.

16. The work vehicle according to claim 11, wherein the vehicle body includes a pair of rear frame that extends in the forward-backward direction at intervals therebetween in a width direction of the vehicle body;

an exterior cover that is provided above the rear frame and in which the heat exchange room is formed inside the exterior cover; and a bumper that is provided to extend in the width direction over the pair of rear frames on the rear sides of the rear frames, includes an upper surface which becomes the rear passage, and partitions and forms the opening portion along with the exterior cover, wherein the shroud body is supported to the structure member from the rear side when the blower unit is at the closed position, and wherein the fixing portion fixes the shroud body to the ring shroud from the front side when the blower unit is at the closed position.

17. The work vehicle according to claim 10, wherein the fan includes a hydraulic motor that is driven by a hydraulic pressure, and a fan body that includes a plurality of blades fixed to a drive shaft of the hydraulic motor, wherein the work vehicle further includes a hydraulic pipe which is provided on the other side of the shroud body in the direction of the axis and through which a hydraulic pressure is supplied to the hydraulic motor.

18. The work vehicle according to claim 10, wherein the vehicle body includes a pair of rear frame that extends in the forward-backward direction at intervals therebetween in a width direction of the vehicle body;

an exterior cover that is provided above the rear frame and in which the heat exchange room is formed inside the exterior cover; and a bumper that is provided to extend in the width direction over the pair of rear frames on the rear sides of the rear frames, includes an upper surface which becomes the rear passage, and partitions and forms the opening portion along with the exterior cover, wherein the shroud body is supported to the structure member from the rear side when the blower unit is at the closed position, and wherein the fixing portion fixes the shroud body to the ring shroud from the front side when the blower unit is at the closed position.

19. The work vehicle according to claim 1, wherein the fan includes a hydraulic motor that is driven by a hydraulic pressure, and a fan body that includes a plurality of blades fixed to a drive shaft of the hydraulic motor, wherein the work vehicle further includes a hydraulic pipe which is provided on the other side of the shroud body in the direction of the axis and through which a hydraulic pressure is supplied to the hydraulic motor.

20. The work vehicle according to claim 1,
wherein the vehicle body includes
a pair of rear frame that extends in the forward-backward direction at intervals therebetween in a width direction of the vehicle body;
an exterior cover that is provided above the rear frame and in which the heat exchange room is formed inside the exterior cover; and
a bumper that is provided to extend in the width direction over the pair of rear frames on the rear sides of the rear frames, includes an upper surface which becomes the rear passage, and partitions and forms the opening portion along with the exterior cover,
wherein the shroud body is supported to the structure member from the rear side when the blower unit is at the closed position, and
wherein the fixing portion fixes the shroud body to the ring shroud from the front side when the blower unit is at the closed position.

* * * * *